United States Patent [19]

Suzuki

[11] Patent Number: 5,075,860

[45] Date of Patent: Dec. 24, 1991

[54] CONTINUOUSLY VARIABLE TRANSMISSION CONTROL SYSTEM

[75] Inventor: Yutaka Suzuki, Atsugi, Japan

[73] Assignee: Nissan Motor Co., Ltd., Yokohama, Japan

[21] Appl. No.: 592,931

[22] Filed: Oct. 4, 1990

[30] Foreign Application Priority Data

Oct. 4, 1989 [JP] Japan .................. 1-259374

[51] Int. Cl.$^5$ .................. G06F 15/20; B60K 41/12
[52] U.S. Cl. .................. 364/424.1
[58] Field of Search .................. 364/424.1; 74/866

[56] References Cited

U.S. PATENT DOCUMENTS

| | | | |
|---|---|---|---|
| 4,509,125 | 4/1985 | Fattic et al. | 364/424.1 |
| 4,637,280 | 1/1987 | Oshiage | 364/424.1 |
| 4,649,486 | 3/1987 | Oshiage | 364/424.1 |
| 4,735,113 | 4/1988 | Yamamuro et al. | 74/866 |
| 4,884,653 | 12/1989 | Kouno | 364/424.1 |
| 4,956,972 | 9/1990 | Sasajima et al. | 364/424.1 |

Primary Examiner—Salvatore Cangialosi
Attorney, Agent, or Firm—Foley & Lardner

[57] ABSTRACT

According to a ratio control system for a continuously variable transmission, proportional and feedback gains are variable with a first time derivative of a target reduction ratio that is determined in response to throttle opening degree and a vehicle speed. These gains are proportional to the first time derivative of the target reduction ratio.

13 Claims, 6 Drawing Sheets

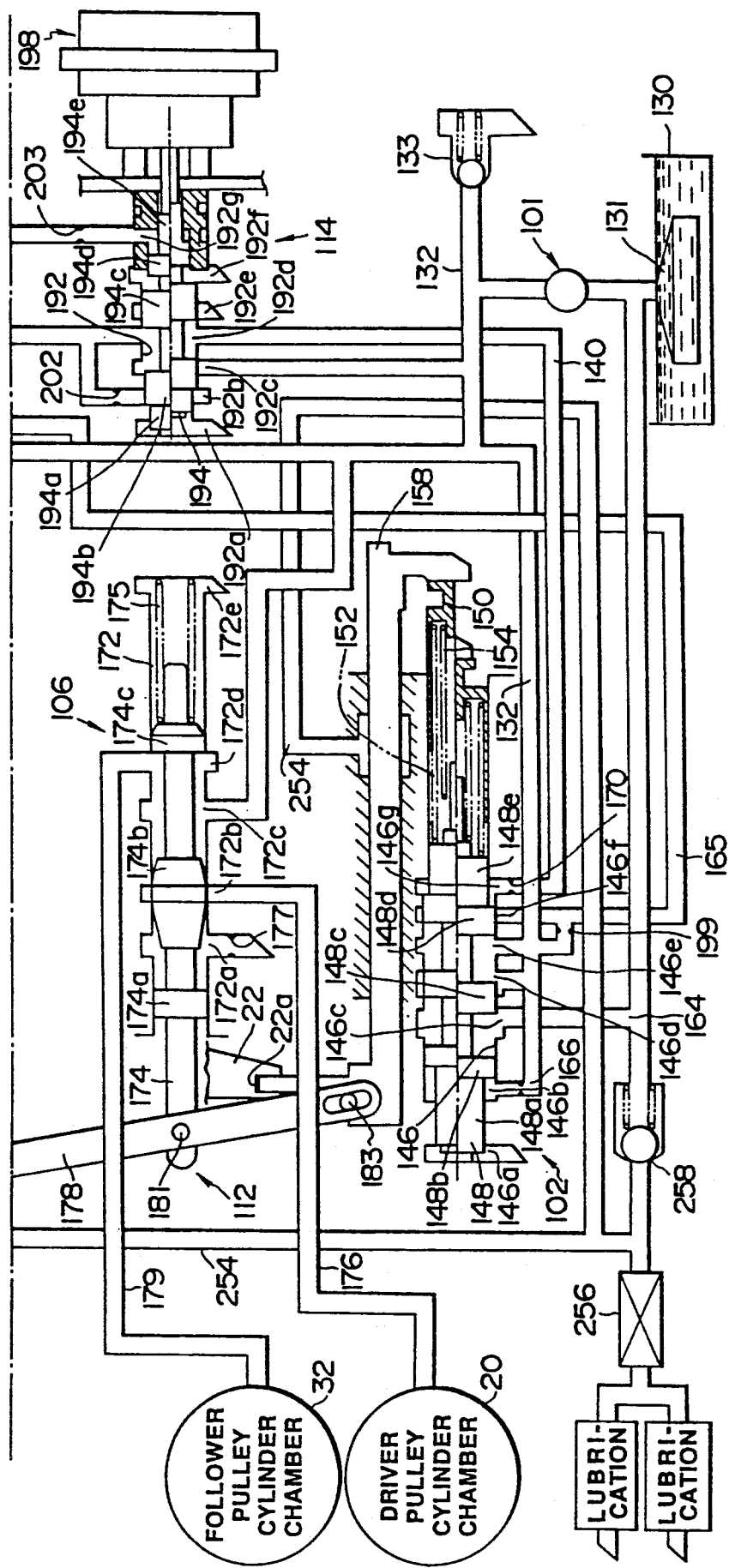

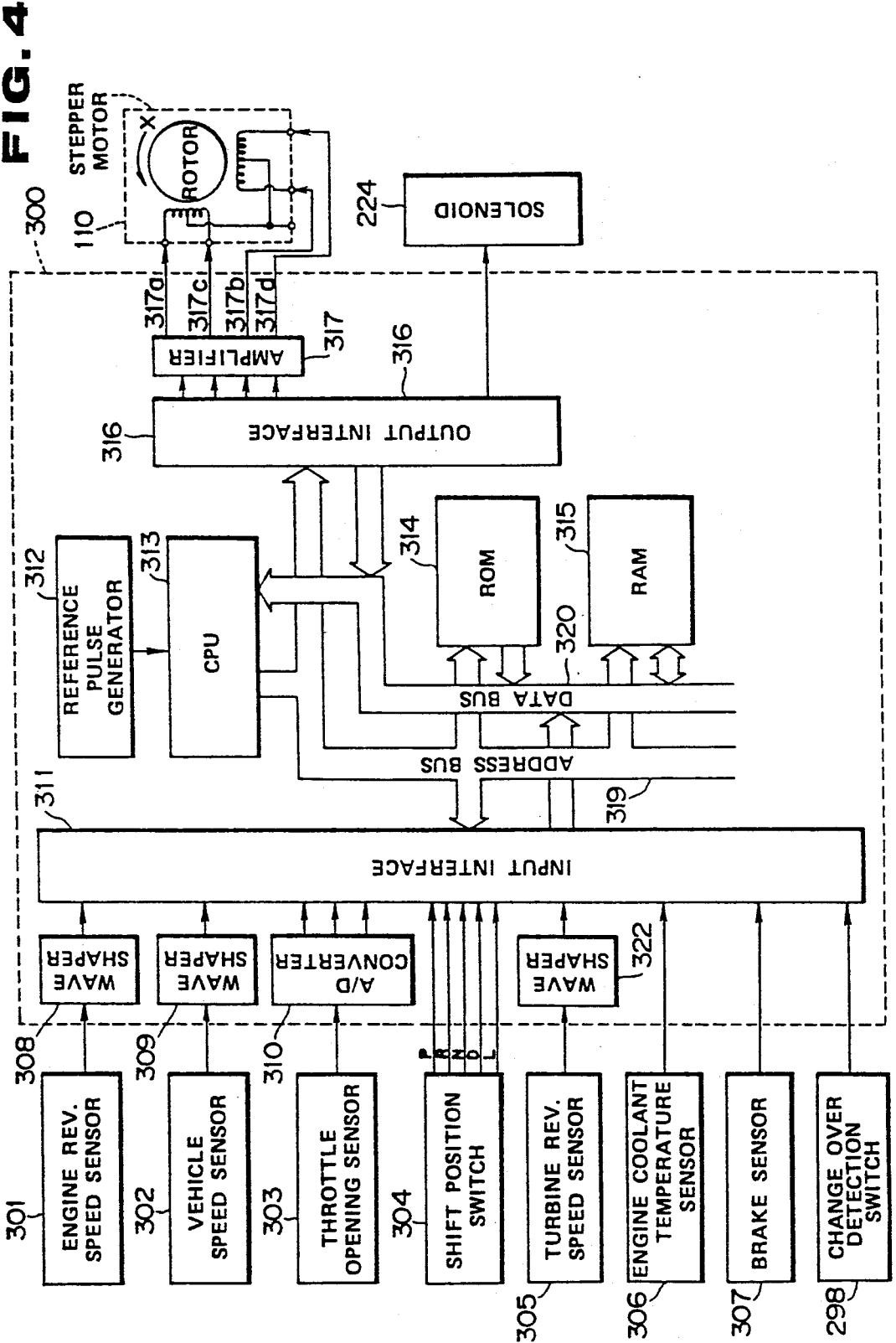

CONTINUOUSLY VARIABLE TRANSMISSION CONTROL SYSTEM

RELATED APPLICATION

U.S. patent application Ser. 07/592,933 claiming priority on Japanese Patent Appln. No. 1-259376.

BACKGROUND OF THE INVENTION

The present invention relates to a ratio control system for a continuously variable transmission in a motor vehicle.

U.S. Pat. No. 4,735,113 discloses a continuously variable transmission for a vehicle. According to a known ratio control system for the continuously variable transmission, a feedback control is effected whereby a reduction ratio in the continuously variable transmission is controlled in such a direction as to decrease an input revolution speed error or deviation toward zero. In this known feedback control, proportional and integral gains are constant. If such feedback gains are set so as to effect an optimum upshift toward the smallest or minimum reduction ratio during operation with large throttle openings, an excessively quick upshift results during operation with small throttle openings. On the contrary, if the gains are set so as to effect an optimum upshift during operation with small throttle openings, an excessively slow upshift results during operation with large throttle openings. Thus, a difficulty arises in setting the feedback gains.

SUMMARY OF THE INVENTION

An object of the present invention is to provide a ratio control for a continuously variable transmission which has solved the above-mentioned problem.

According to the present invention, there is provided a ratio control system for a continuously variable transmission which is shiftable from a present reduction ratio to a target reduction ratio in response to an output signal given by a feedback control equation involving at least one gain and an input revolution speed deviation, wherein the gain is variable with a first time derivative of the target reduction ratio.

According to another aspect of the present invention, there is provided a method of controlling a ratio change in a continuously variable transmission in a motor vehicle, the method comprising the steps of:

repeatedly determining a target value in a predetermined variable representative of a reduction ratio in the continuously variable transmission;

repeatedly determining a first time derivative of said target value;

repeatedly setting proportional and integral gains of a feedback control equation in response to said first time derivative of said target value;

determining an output signal from said feedback control equation; and controlling a ratio change in the continuously variable transmission in response to said output signal.

BRIEF DESCRIPTION OF THE DRAWINGS

FIGS. 3A and 3B, when combined, are a hydraulic circuit diagram showing a control system for the continuously variable transmission;

FIG. 4 is a block diagram showing a control unit for executing a flowchart shown in FIG. 5.

DETAILED DESCRIPTION OF THE INVENTION

Referring to the accompanying drawings, and particularly to FIGS. 2, 3A, 3B, and 4, reference is made to a description in connection with FIGS. 2, 1A, 1B, and 3 of U.S. Pat. No. 4,735,113 which is hereby incorporated by reference.

Figure 1:
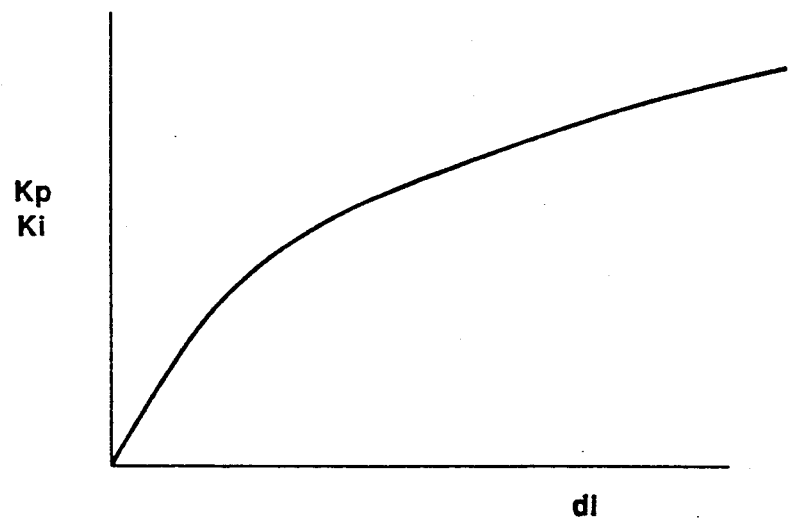
FIG. 1 is a characteristic curve of a gain versus a first time derivative of a target reduction ratio, the gain being representative of both a proportional gain and an integral gain.
Figure 2:
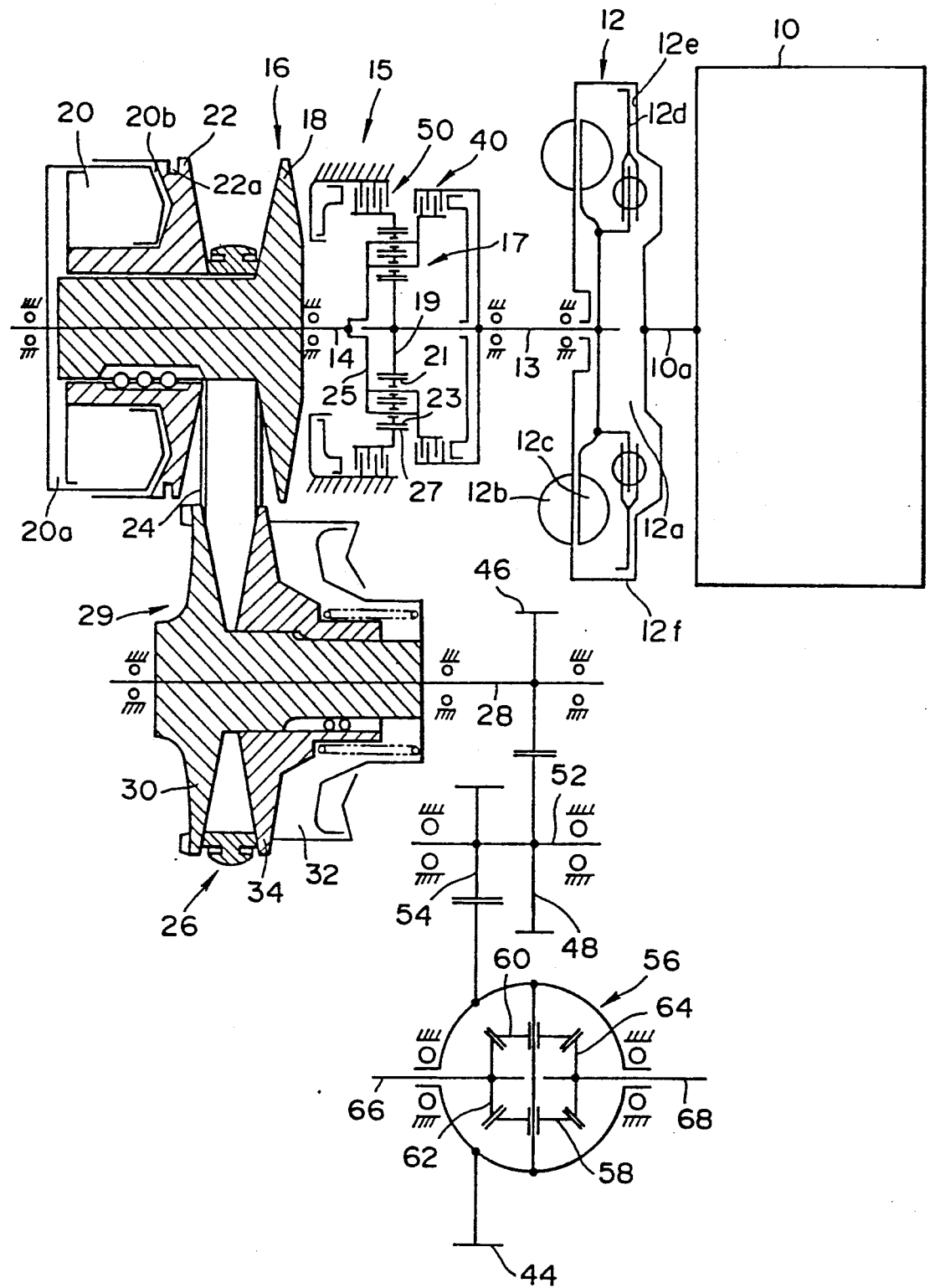
FIG. 2 is a schematic illustration of a continuously variable transmission drivingly connected to an engine of a motor vehicle.
Figure 3A:
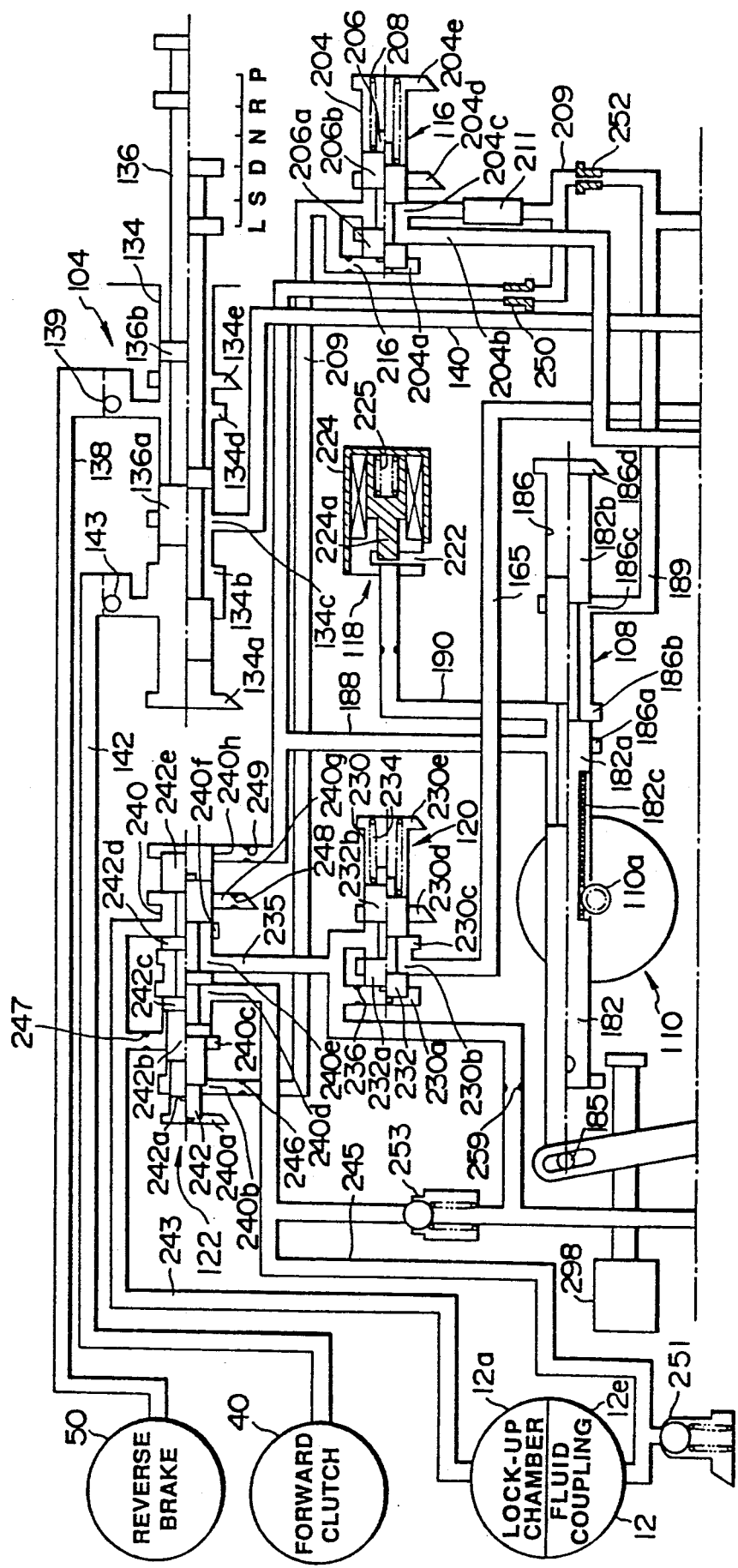
Figure 5:
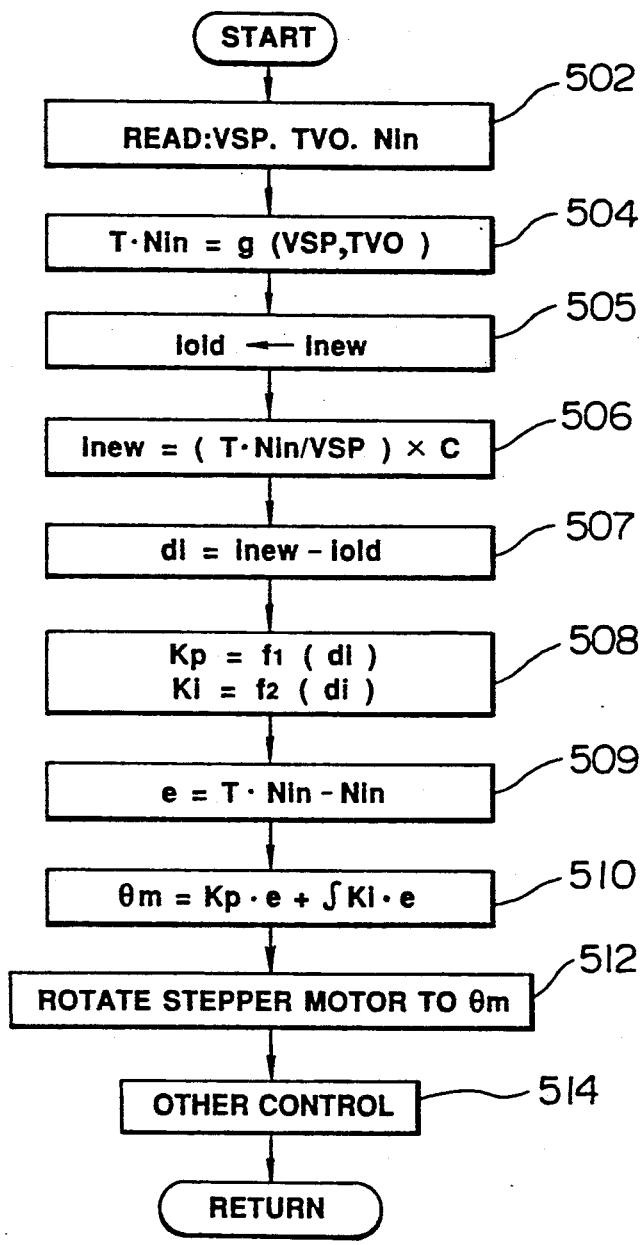
FIG. 5 is the flowchart illustrating the gist of the invention.

Referring to the flowchart shown in FIG. 5, at a step 502, reading operation is performed to store output signals of a vehicle speed sensor 302, a throttle opening sensor 303, and a turbine revolution speed sensor 305 as a vehicle speed VSP, a throttle valve opening TVO and an input revolution speed Nin, respectively. At the subsequent step 504, a target input revolution speed T·Nin is determined after performing a table look-up operation of a predetermined shift point mapping based on vehicle speed VSP and throttle opening degree TVO. A target reduction ratio inew given in the preceding operation cycle of this routine is stored as an old target reduction ratio iold. Then, at a step 506, the target reduction ratio inew is updated by a result from calculating an equation that T·Nin/VSP×C, where C is constant. At the next step 507, a first time derivative of reduction ratio di is given by substracting iold from inew. Then, at a step 508, a proportional gain Kp is given as a function of the first time derivative of reduction ratio di, namely Kp=f1(di), and an integral gain Ki is given as a function of the first time derivative of reduction ratio di, namely Ki=f2(di). The functions f1(di) and f2(di) are illustrated by a characteristic curve shown in FIG. 1. As shown in FIG. 1, the proportional and integral gains Kp and Ki are proportional to the first time derivative of reduction ratio di. As readily seen from FIG. 1, the gains are larger when the first time derivative of reduction ratio di is relatively large than they are when the first time derivative of reduction ratio di is relatively small. At the subsequent step 509, an input revolution speed error or deviation e is given by subtracting the actual input revolution speed Nin from the target input revolution speed T·Nin, namely e=T·Nin−Nin. At the next step 510, a target motor position 74 m is given after calculating a feedback control equation that $\theta$ m=Kp·e+∫Ki·e. Then, at a step 512, a control signal is output whereby a shift actuator in the form of a stepper motor 110 is rotated to the target motor position $\theta$ m. Subsequently, the other control is processed at a step 514.

According to the above described control process, the proportional and integral gains Kp and Ki are increased as the first time derivative of target reduction ratio di is increased, and the target motor position $\theta$ m is also increased. Accordingly, when the throttle opening degree TVO falls in a wide open throttle opening area, a speed of ratio change becomes high to provide a good shift response, while when the throttle opening degree TVO falls in a small throttle opening area, a speed of shift becomes low, thus avoiding occurrence of overshoot phenomena.

What is claimed is:

1. A ratio control system for a continuously variable transmission which is shiftable from a present reduction ratio to a target reduction ratio, comprising:

a control unit for executing a feedback control equation involving at least one gain and an input turbine speed deviation which is stored in said control unit, said gain being variable with a first time derivative of said target reduction ratio, and said control unit producing an output signal which is determined by said feedback equation; and means for shifting said transmission in response to said output signal.

2. A ratio control system as claimed in claim 1, wherein the gain is larger when said first time derivative of the target reduction ratio is relatively large than when said first time derivative of the target reduction ratio is relatively small.

3. A ratio control system for a continuously variable transmission which is shiftable from a present reduction ratio to a target reduction ratio, comprising:

a control unit for executing a feedback control equation involving a proportional gain, an integral gain, and an input turbine speed deviation which is stored in said control unit, said gain being variable with a first time derivative of said target reduction ratio, and said control unit producing an output signal which is determined by said feedback equation; and means for shifting said transmission in response to said output signal.

4. A ratio control system as claimed in claim 3, wherein the proportional and integral gains are larger when said first time derivative of the target reduction ratio is relatively large than when said first time derivative of the target reduction ratio is relatively small.

5. A ratio control system for a continuously variable transmission in a motor vehicle, the continuously variable transmission having an input member and being shiftable from a present reduction ratio to a target reduction ratio, the ratio control system comprising:

means for detecting a revolution speed of the input member and generating an input revolution speed indicative signal which is indicative of the revolution speed detected;

a control unit operatively coupled with said revolution speed detecting means, said control unit receiving said input revolution speed indicative signal and generating an output signal; and means for effecting a shift in reduction ratio in said continuously variable transmission in response to said output signal, wherein said control unit further includes means for determining a first time derivative of said target reduction ratio; means for determining a target input revolution speed of the input member and generating a target input revolution speed indicative signal which is indicative of said target revolution speed determined; means for storing a feedback control equation involving gains and a deviation between said input revolution speed indicative signal and said target input revolution speed indicative signal; means for generating said output signal after calculating said feedback control equation, and means for varying said gains in response to said first time derivative of said target reduction ratio.

6. A ratio control system as claimed in claim 5, further comprising means for detecting a vehicle speed of the motor vehicle and generating a vehicle speed indicative signal which is indicative of said vehicle speed detected, wherein said control unit includes means for determining the target reduction ratio after dividing said input revolution speed indicative signal by said vehicle speed indicative signal.

7. A ratio control system as claimed in claim 6, wherein said gains are a proportional gain and an integral gain.

8. A method of controlling a ratio change in a continuously variable transmission in a motor vehicle, the method comprising the steps of:

(a) repeatedly determining a target value in a predetermined variable representative of a reduction ratio in the continuously variable transmission;

(b) repeatedly determining a first time derivative of said target value;

(c) repeatedly setting proportional and integral gains of a feedback control equation in response to said first time derivative of said target value;

(d) determining an output signal from said feedback control equation; and (e) controlling a ratio change in the continuously variable transmission in response to said output signal.

9. A method as claimed in claim 8, wherein, in said step (c), said proportional and integral gains increase in response to an increase in said first time derivative of said target value.

10. A method as claimed in claim 8, wherein, in said step (c) said proportional and integral gains are proportional to said first time derivative of said target value.

11. A method as claimed in claim 8, wherein, said step (a) further includes the steps of:

determining a target input revolution speed of an input member of the continuously variable transmission;

detecting a vehicle speed of the motor vehicle; and determining said target value as a function of said target input revolution speed and said vehicle speed.

12. A method as claimed in claim 11, further comprising the steps of:

detecting an actual input revolution speed of the input member of the continuously variable transmission; and repeatedly determining a deviation between said actual revolution speed and said target revolution speed.

13. A method as claimed in claim 12, wherein said feedback control equation involves said deviation as a variable.

* * * * *